Sept. 6, 1966

F. T. TURNER 3,271,576

PHOTOELECTRIC MATRIX NETWORK

Filed Jan. 29, 1963

INVENTOR.
FRANK T. TURNER

BY M. R. Marsh

ATTORNEY

United States Patent Office 3,271,576

Patented Sept. 6, 1966

3,271,576

PHOTOELECTRIC MATRIX NETWORK

Frank T. Turner, Hampton Bays, N.Y., assignor to The Western Union Telegraph Company, New York, N.Y.

Filed Jan. 29, 1963, Ser. No. 254,785
3 Claims. (Cl. 250—206)

Figures 1, 2:
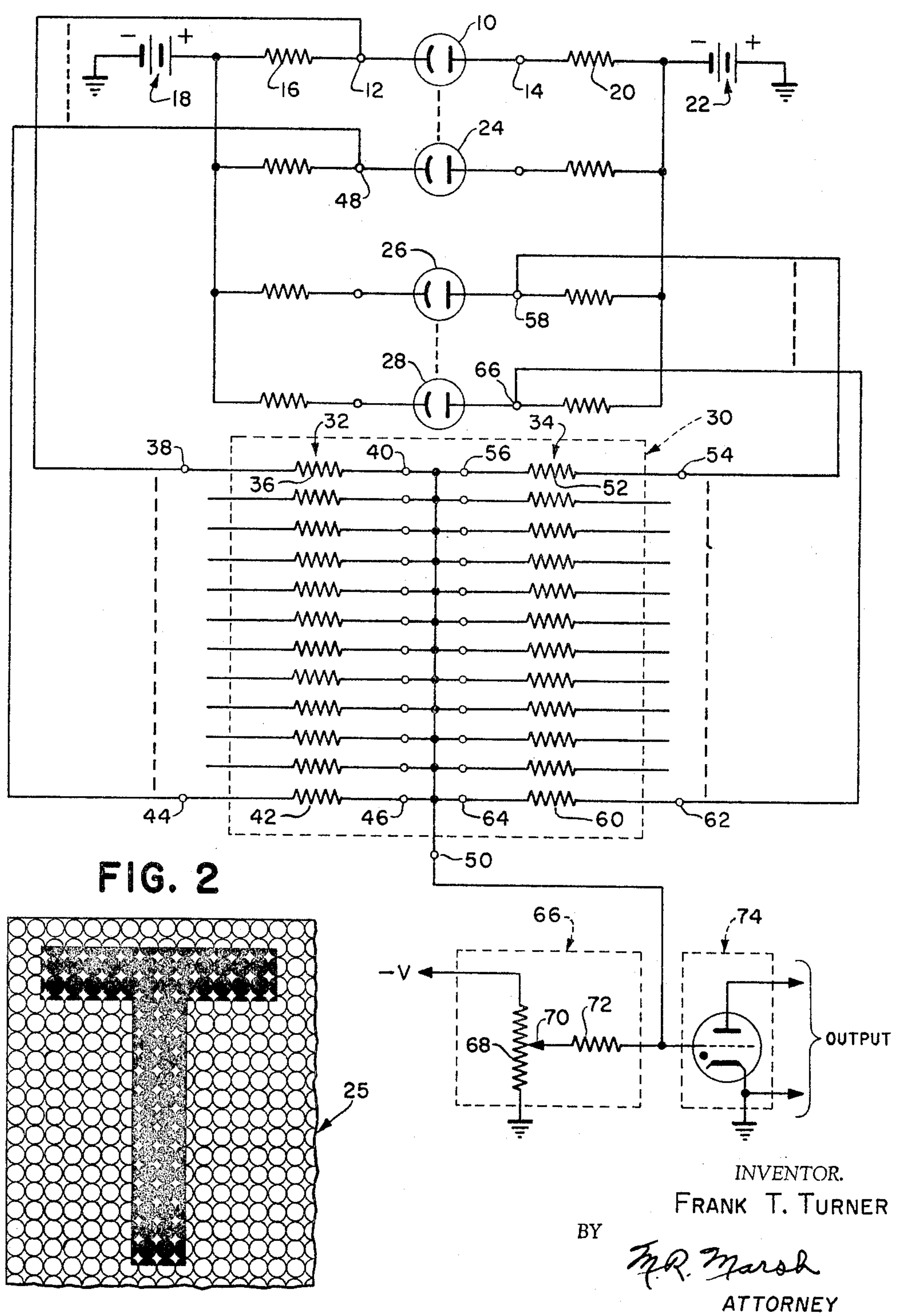

This invention relates generally to a photoelectric network and more particularly to a network which indicates the occurrence of discrete patterns of light and dark areas.

It comprises an electrically energized system of optically responsive sensors in the form of a geometric array of photocells which are arranged to respond to the degree of illumination on each elemental area of the geometric field upon which such an optically sensible character may be projected. By energizing, and by connecting these sensors to a resistive combining network later described, they are arranged to provide a maximized output potential for the specific character associated with that particular network without regard, within limits, to the orientation or translatory position of the character on the field. The maximized potential is sufficiently definite and stable to enable it to be used for overcoming a bias voltage unique to the character, thus triggering an avalanche discharge or threshold device, indicating detection of the character. Both the cells illuminated by the projected character and cells not so illuminated, actively participate in production of the maximized potential in the combining network, greatly increasing the sharpness of discrimination of the device.

It is an object of this invention to provide a device which detects and indicates the occurrence of a discrete pattern of light and dark areas.

It is another object of this invention to provide a device which indexes the occurrence of a discrete pattern of light and dark areas by means of a potential signal.

It is still another object of this invention to provide a device which is reliable in operation and economical to use.

Other objects and many of the attendant advantages of this invention will be readily appreciated as the apparatus becomes better understood by reference to the following detailed description when considered in connection with the accompanying drawing wherein:

FIG. 1 is a schematic diagram in accordance with the principles of the invention; and FIG. 2 is a view of a photoelectric matrix upon which an enlarged character has been projected.

Briefly, in this invention a photoconductive type of photoelectric cell is interposed between a source of positive potential and a source of negative potential, an impedance being positioned between each source of potential and the photoelectric cell.

The photocell is of the photoconductive type which represents a high resistance when not illuminated, and a lower resistance when it is illuminated. The terminal of the photocell which is coupled to the source of positive potential is referred to hereafter as the "covered" terminal, and the terminal of the photocell which is coupled to the source of negative potential is referred to as the "not covered" terminal.

A plurality of photocells, each coupled as above described, are arranged to form a matrix—the covered terminals of certain photocells and the not covered terminals of certain other photocells being coupled to a resistive combining network. A maximum potential is generated by the resistive combining network when the photocells of the matrix are exposed to a projected image of a character such that all those photocells which have their covered terminals coupled to the resistive combining network are covered by the projected dark portion of the character—and those photocells which have their not covered terminals coupled to the resistive combining network are not covered by the projected dark portion of the character.

With reference to FIG. 2 there is illustrated a matrix of photocells each supporting a covered terminal and a not covered terminal. Also illustrated is an enlarged image of the character "T" projected onto the matrix of photocells.

Proceeding now to FIG. 1, a photocell 10 supports a covered terminal 12 and a not covered terminal 14. The covered terminal 12 is coupled through an impedance such as a resistor 16 to a source of positive potential 18. The not covered terminal 14 is coupled through an impedance such as a resistor 20 to a source of negative potential 22. Each one of the other photocells of the matrix 25 (FIG. 2) is coupled to a source of positive potential and a source of negative potential in a manner similar to that of photocell 10. Each of the other photocells of the matrix are represented by the photocells 24, 26, and 28 illustrated.

The photocell 10 is of the photoconductive type such as a cadmium sulfide type of cell, a cadmium selenide type of cell or the like which presents a high resistance across its terminals when not exposed to light, and a smaller resistance across its terminals when it is exposed to light. Thus, with reference to a photocell which is typical of each of the photocells of the matrix, the covered terminal displays a positive potential with respect to a ground terminal when the photocell is covered by the dark projected portion of a character, and the not covered terminal displays a negative potential with respect to a ground terminal when the photocell is covered by a dark projected portion of a character. Continuing, the covered terminal displays a potential with respect to a ground terminal equal substantially to zero when the photocell is not covered by the dark projected portion of the character, and the not covered terminal also displays a potential with respect to a ground terminal equal substantially to zero when the photocell is not covered by the dark projected portion of the character.

The potential signals on the covered and not covered terminals of the photocells are fed to a resistive combining network 30 to obtain a resultant.

The resistive combining network 30 comprises a plurality of resistors arranged to form a first group 32 and a second group 34. One terminal of each resistor of the first group is coupled to a covered terminal of a photocell, and one terminal of each resistor of the second group is coupled to a not covered terminal of a photocell. The other terminals of the resistor of the first and second groups are coupled together to a common terminal.

The first group of resistors 32 can be referred to as the covered resistors because they are associated with the covered terminals. The first appearing resistor 36 of its first group of resistors 32 supports two terminals 38 and 40. Terminal 38 is coupled to the covered terminal 12 of photocell 10, and the terminal 40 is coupled to a common output terminals 50. The last resistor 42 of the first group of resistors 32 supports two terminals 44 and 46. Terminal 44 is coupled to the covered terminal 48 of the photocell 24, and the terminal 46 is coupled to the common output terminal 50.

In a similar manner the second group of resistors 34 can be referred to as the not covered resistors because they are associated with the not covered terminals. The first appearing resistor 52 of the second group of resistors 34 supports two terminals 54 and 56. Terminal 54 is coupled to the not covered terminal 58 of the photocell 26 and the terminal 56 is coupled to a common output terminal 50. The last resistor 60 of the second group of resistors 34 supports two terminals 62, 64. Terminal 62 is coupled to the not covered terminal 66 of the photocell 28, and the terminal 64 is coupled to the common output terminal 50.

The other resistors of group 32, those positioned between resistors 36 and 42 are coupled in a manner similar to the coupling of resistors 36 and 42—that being that one terminal of each resistor is connected to a covered terminal of a photocell and the other terminals are connected to the common output terminal 50. In a similar manner, the other resistors of group 34, those positioned between resistors 52 and 60 are coupled in a manner similar to the coupling of resistors 52 and 60—that being that one terminal of each resistor is connected to a not covered terminal of a photocell and the other terminals being connected to the common output terminal 50.

The total number of resistors in the first and second groups 32, 34 of resistors is not critical, the number finally being used being dependent upon the application and requirements that must be satisfied. However, in its most convenient form the number of resistors in group 32 are equal to the number of resistors in group 34.

The common output terminal 50 is coupled to feed a signal—the output signal of the resistive combining network 30—to the grid terminal of a thyratron type of tube. A bias source network 66 comprising an impedance 68 coupled between a source of negative potential and a ground terminal supports a tap terminal 70 coupled through an impedance 72 to an output means 74 such as a thyratron, a silicon rectifier, a Schmidt trigger network, an overdriven amplifier or the like having a threshold potential that must be overridden to become activated. For purposes of convenience the output means 74 is illustrated as a thyratron. However, it is to be understood that this invention is not restricted to being used with a thyratron, and that device as indicated can be used with success. The bias source network 66 is used to compensate for the differentials of sensitivity of the photocells, and the variations in values of the resistors and to establish a desired operating point.

If each of the photocells and the resistors were identical, then with a blank field on the photocell matrix 25 a zero potential would appear at terminal 50. However, it is extremely difficult to obtain such uniformity of characteristics, therefore, to compensate for the slight variation in characteristics of the components the bias source network 66 is provided.

In operation, an image of a character to be identified is projected onto the photocell matrix. Naturally, each different letter or symbol will cover a unique group of photocells and, therefore, any character can be recognized by noting the output of a properly selected set of cells unique for that character. Therefore, a separate resistive combining network 30 is provided for each character that is to be identified, the first group of resistors 32 of a network being connected to cover terminals of photocells covered by the projected image of the character to be identified, and the second group of resistors 34 of the same network being connected to not covered terminals of photocells not covered by the projected image of the character to be identified.

In choosing the proper covered and not covered terminals required to identify a particular character care must be exercised to insure that the combination is distinctive for that particular character chosen and that no other character that is to be identified will cover all of the photocells connected to the resistors in the first group 32 and leave uncovered all of the photocells connected to the resistors in the second group 34.

Furthermore, the covered and not covered terminals of any one particular photocell can be connected to a number of resistors within a reasonable limit determined by the relative magnitudes of the photocell impedance and the resistors.

The potential present at the terminal 50 is a maximum at that instant that each resistor of the first group of resistors 32 is connected to a photocell which is covered by an image of a character, and each resistor of the second group of resistors 34 is connected to a photocell which is not covered by the image. Thus, if the proper covered and not covered terminals are chosen, only one resistive combining network 30 will display a maximum potential for each character projected onto the photocell matrix.

The absence of a projected dark portion of a character on a single photocell that should be covered—or the presence of a projected dark portion of a character on a single photocell that should not be covered results in a reduced output potential from the resistive combining network 30. Further mismatching of the projected image with the photocells of the matrix results in a further reduction in the output potential. Therefore, by appropriately designing the structure to operate not only when there is a perfect match between the projected image and the selected covered and not covered photocells, but to also operate when there is a slight mismatch between the projected image and one, two, or three or more covered and/or uncovered photocells, the invention can identify imperfect characters.

The bias source network 66 is adjusted to drive the thyratron type tube deep enough into its cut off region such that only a maximum potential from a resistive combining network 30 will urge the tube into its conductive state.

Obviously, many modifications and variations of the present invention are possible in the light of the above teachings. It is, therefore, to be understood that within the scope of the appended claims the invention may be practiced otherwise than as specifically described.

What is claimed is:

1. A network comprising a plurality of light sensitive means each having an impedance which varies substantially linearly with changes in light intensities arranged to form a matrix each having a first terminal and a second terminal, a source of positive potential coupled to the first terminal of each light sensitive means, a source of negative potential coupled to the second terminal of each light sensitive means, a first impedance interposed between said source of positive potential and the first terminal of each light sensitive means, a second impedance interposed between said source of negative potential and the second terminal of each light sensitive means, a first group of resistors coupled to predetermined first terminals, a second group of resistors coupled to predetermined second terminals, output means fed by said first and second groups of resistors, and bias means coupled to said output means.

2. The combination of claim 1 wherein said light sensitive means comprises cadmium sulfide cells.

3. The combination of claim 1 wherein said light sensitive means comprises cadmium selenide cells.

References Cited by the Examiner

UNITED STATES PATENTS

| | | | |
|---|---|---|---|
| 2,801,343 | 7/1957 | Johnson | 340—146.3 |
| 3,104,368 | 9/1963 | Stinbuch | 250—219 |
| 3,157,792 | 11/1964 | Low et al. | 250—210 |

RALPH G. NILSON, *Primary Examiner.*

WALTER STOLWEIN, *Examiner.*

J. D. WALL, *Assistant Examiner.*